United States Patent [19]
De Gennes

[11] 3,970,172
[45] July 20, 1976

[54] CLOSED-LOOP TYPE DISC BRAKE
[75] Inventor: Gérard De Gennes, Senlis, France
[73] Assignee: Societe Anonyme Francaise du Ferodo, Paris, France
[22] Filed: Nov. 15, 1974
[21] Appl. No.: 524,342

[30] Foreign Application Priority Data
Nov. 16, 1973 France .............................. 73.40831
Oct. 29, 1974 France .............................. 74.36059

[52] U.S. Cl. .............................................. 188/73.4
[51] Int. Cl.$^2$ ........................................ F16D 65/02
[58] Field of Search ................. 188/73.3, 73.4, 73.5, 188/72.5

[56] References Cited
UNITED STATES PATENTS

| | | | |
|---|---|---|---|
| 3,493,084 | 2/1970 | Maurice | 188/73.4 |
| 3,532,192 | 10/1970 | Falk | 188/73.4 |
| 3,580,362 | 5/1971 | Falk | 188/73.4 |
| 3,658,160 | 4/1972 | Beller et al. | 188/73.4 |

FOREIGN PATENTS OR APPLICATIONS

| | | | |
|---|---|---|---|
| 2,014,468 | 10/1970 | Germany | 188/73.4 |
| 1,910,320 | 1/1970 | Germany | 188/73.5 |

Primary Examiner—Trygve M. Blix
Assistant Examiner—Edward R. Kazenske
Attorney, Agent, or Firm—Young & Thompson

[57] ABSTRACT

The present invention relates to a disc-brake of the kind comprising a fixed support, a disc fast for rotation with a shaft to be braked, two brake-shoes each arranged respectively one on each side of the disc and movable perpendicularly to the plane of the disc and a hydraulic operating unit comprising a blind cylinder with a moving piston acting on a first brake-shoe, the cylinder being associated with the movement of the transfer member for acting on the second brake-shoe and subjected to springs urging the member radially towards the periphery of the disc, the fixed support being provided removably with locking and guiding pins ensuring the radial retention of the transfer member through the operating unit and in contact with which this unit is slidably mounted.

37 Claims, 20 Drawing Figures

CLOSED-LOOP TYPE DISC BRAKE

The present invention relates generally to disc-brakes intended specially for the equipment of automobile vehicles and comprising a fixed support, a disc mounted rotatably and capable of being fixed for rotation to a shaft to be braked, two brake-shoes each arranged respectively one on each side of the said disc and movable perpendicularly to the plane of the disc, a hydraulic operating unit forming a separate part of the fixed support and adapted to act directly on one of the said brake-shoes and indirectly on the other through the intermediary of a transfer member having the general shape of a ring which surrounds the fixed support, the disc and the brake-shoes being located on the side of this latter, substantially along a chord of the said disc, elastic means supported on the fixed support and acting on the transfer member along a radial direction of the disc, and retention means which ensure the radial retention of the transfer member in the said direction, on each side of the disc.

In a brake of this kind which has particularly been described in U.S. Pat. No. 3,493,084 filed on June 10th 1968, on the one hand, the distribution of the functions carried out inside the brake by its various constituent parts is advantageously definite, so that each of the said constituent parts is advantageously only subjected to simple and well-defined forces, the ring forming the transfer member being able for this reason to have a simple shape, and on the other hand and conjointly, the access to the brake-shoes for the purpose of changing them remains easy due to the removability of the operating unit, which in fact permits of such access without it being necessary to disconnect the conduits which ensure the supply to this operating unit.

However, in the construction which forms more precisely the object of the U.S. Patent referred to above, the hydraulic operating unit comprises a cylinder open at its two ends and which, although mounted in a removable manner on the fixed support and therefore forming a separate part of this support, is in operation rigidly secured to this fixed support and inside which two pistons are mounted movably in opposite directions, one for acting on a brake-shoe and the other for acting on the transfer member.

This arrangement results in constructions which are relatively bulky axially.

It is furthermore known to carry the hydraulic operating unit on the transfer member, this operating unit then comprising a cylinder with one closed extremity, inside which slides only one single piston.

This arrangement results in a reduced axial bulk.

However, up to the present time, it appeared incompatible with the arrangement described in the above-mentioned patent, the latter assuming in fact the fixing of the hydraulic operating unit on the fixed support, this fixing ensuring on assembly the final locking of the various constituent parts of the brake and especially ensuring, at least in part, the radial retention of the transfer member.

The present invention has for its object a disc-brake which however conciliates in an advantageous manner the two foregoing arrangements.

This disc-brake is therefore of the kind comprising a fixed support, a disc rotatably mounted and capable of being fixed for rotation to a shaft to be braked, two brake-shoes each arranged respectively one on each side of the said disc and movable perpendicularly to the plane of the disc, a hydraulic operating unit forming a separate part of the fixed support and adapted to act directly on one of the said brake-shoes and indirectly on the other by means of a transfer member having the general shape of a ring which surrounds the fixed support, the disc and the brake-shoes on each side of this latter, following substantially a chord of the said disc, elastic means supported on the fixed support and acting on the transfer member along a radial direction of the disc, and retaining means which ensure the retention of the transfer member in the said direction, on each side of the disc, and is characterized in that, in combination, the operating unit comprises a blind cylinder in which is slidably mounted a piston adapted to act on the first brake-shoe and which is associated in movement with the transfer member for action on the second brake-shoe, and, on one side of the disc, the radial retention means of the transfer member comprises two locking and guiding pins which are carried in a removable manner by the fixed support, substantially parallel to the axis of the disc, and in contact with which the blind cylinder of the operating unit is slidably mounted.

Thus, it is by means of the operating unit which it carries that the transfer member is on the one hand retained radially and on the other hand guided in its movement parallel to the axis of the disc, and it is this arrangement which makes it possible advantageously to conciliate the two arrengements previously described, namely on the one hand that permitting a definite distribution of the functions assumed inside the brake by its various constituent parts, with easy access to the brake-shoes, and on the other hand that which, by the adoption of an operating unit with a blind cylinder, enables the axial dimensions of the assembly to be reduced.

In fact, the removability of the operating unit is preserved by virtue of the locking and guiding pins, and this removability, which permits of easy lateral access to the shoes parallel to the axis of the disc, advantageously facilitates the use of a particularly compact and robust fixed support, for example of U-shape or L-shape, such a support not being provided facing the edge of the disc with any opening necessary for the radial passage of the shoes, which is always liable to weaken it, at least for certain applications.

In addition, the support of the blind cylinder against the transfer member may advantageously be effected over a relatively large surface, greater than that possible with a simple piston, which, all other things being equal, makes it possible to lighten the transfer member at this level and in particular to reduce the axial dimensions of this member, without risk of deformation.

According to a particular form of construction, each locking and guiding pin according to the invention has a cylindrical barrel, and the blind cylinder is in contact with this barrel by at least one flat guiding surface.

There is thus a flat surface to cylindrical surface contact between the blind cylinder of the operating unit and the fixed locking pins, and such a contact advantageously permits an excellent sliding action, irrespective of any possible fouling of the parts in contact.

According to this first form of construction, each of the locking and guiding pins is for example simply engaged at one of its extremities in a smooth bore of the fixed support, releasable locking means being associated with such a pin for the controlled axial retention of this pin on the fixed support.

in fact, it then proves relatively simple to ensure the perpendicularity of such a locking and guiding pin with respect to the plane of the disc.

The releasable locking means utilized in order to ensure the controlled axial retention of each locking and guiding pin may be constituted by elastically retractable means established between such a pin and the fixed support, a circlip for example.

However, according to a preferred alternative form of embodiment, these releasable locking means comprise, for each locking pin, a locking member fixed in a removable manner on the fixed support for locking co-operation with a complementary bearing surface formed for that purpose on the locking and guiding pin concerned.

Such a locking member may advantageously be a simple plate, and in this case the locking plate associated with a locing and guiding pin is preferably connected by a bridge member to the locking plate associated with the other locking and guiding pin, the said locking plates and the said member forming conjointly one single piece.

According to a development of this arrangement, this member is adapted to constitute in itself the locking and guiding pins.

Thus, according to a second form of embodiment of the object of the present invention, a brake of the type described above is characterized in that at least one of the locking and guiding pins with which it is provided is a simple sheet steel member, suitably cut-out and bent, fixed in a removable manner on the fixed support of this brake, the said sheet steel member having at least one guiding edge perpendicular to the plane of the disc for co-operation in guiding with a flat face of the operating unit carried by the transfer member.

Each locking and guiding pin is in this case preferably constituted by such a sheet steel member, and the two members of sheet steel thus employed are coupled to each other by a bridge member, the said sheet steel members and the said bridge member forming conjointly with advantage one single piece.

This results advantageously in a simple and economical construction of the locking and guiding members, associated harmoniously with a construction of simple steel sheets, suitably cut-out and bent, of the fixed support on which they are carried.

In addition, the handling of these locking and guiding pins is itself simplified, since they conjointly form one single piece.

The characteristic features and advantages of the invention will furthermore be brought out in the description which follows below, by way of example, reference being made to the accompanying diagrammatic drawings, in which.

According to the form of construction shown in FIGS. 1 to 7, the brake according to the invention comprises globally a fixed support 10 of sheet steel, suitably cut-out and bent, a disc 11 rotatably mounted and capable of being fixed for rotation on the shaft of the wheel to be braked, two brake-shoes 12A, 12B each arranged respectively one on each side of the disc 11 and movable perpendicularly to the plane of this latter, and a hydraulic operating unit 13 intended to act directly on the brake-shoe 12A and indirectly on the brake-shoe 12B through the intermediary of a transfer member 14 which has the general shape of a ring and which surrounds the disc 11, the brake-shoes 12A, 12B, the fixed support 10 and the hydraulic operating unit 13, substantially along a chord of the disc 11.

In the form of embodiment shown, the fixed support 10 has the general shape of a so-called L bracket. It comprises an end-plate 15 which extends substantially parallel to the plane of the disc 11 and a square return 16 which extends substantially perpendicular to this plane beyond the periphery of the disc 11. In its central zone, this return member 16 comprises a central extension 17.

The end-plate 15 of the fixed support 10 is provided facing the disc 11 with a generally rectangular window 20 intended to serve as a housing for the brake-shoe 12A.

On each side of this window 20, the end-plate 15 of the fixed support 10 is lined by reinforcement plates 21, 21' which are fixed to it by any appropriate means, for example by welding.

At the periphery of the window 20, these reinforcing plates 21, 21' are provided here and there with supporting surfaces 22 acting together with the corresponding edge of the window 20 in guiding the shoe 12A in its housing, perpendicular to the plane of the disc 11 and in the radial and circumferential retention of this brake-shoe.

In a manner known per se, this brake-shoe 12A is subjected in its housing 20 to the effect of a leaf-spring 23 which is supported on the edge of its housing nearest to the axis of the disc, and which urges it radially, from the axis of the disc towards the periphery, against the supporting surfaces 22 provided on the opposite edge of this housing.

In the vicinity of their edges nearest to the axis of the disc, the end-plate 15 and the reinforcing plates 21, 21' associated therewith conjointly form lugs 24, 24' intended to permit the fixing of the support 10 to the stub-axle of the wheel to be braked.

On opposite sides of the window 20, the end-plate 15 and its reinforcing plates 21, 21' carry conjointly in their central zone studs 25, 25' which extend substantially parallel to the axis of the disc, and the function of which will become apparent later.

Also on opposite sides of the window 20 but in the vicinity of the return 16, the end-plate 15 and its reinforcing plates 21, 21' are conjointly provided with drilled and tapped holes 26, 26' for removably mounting the locking and guiding pins 27, 27' substantially parallel to the axis of the disc.

Each of these locking and guiding pins 27, 27' comprises a hexagonal operating head 28, 28', a cylindrical barrel 29, 29', a locking nut 30, 30' and a threaded extremity 31, 31' intended to be screwed into the corresponding tapped hole 26, 26'.

A stop-plate 32, 32' is provided for fixing the locking nut 30, 30' of the pins 27, 27'.

On its lower face, the central extension 17 of the return 16 of the fixed support 10 forms the supporting surfaces 35, 35', substantially flat and co-planar, for the radial retention of the brake-shoe 12B.

Conjointly, the plate 34B provided on the support has two shoulders 36, 36' for co-operation with the supporting surfaces 35, 35' of the fixed support, and the hooks 38, 38' for engagement on the central extension 17 of the return 16 of the support.

In its central zone, the plate 34B of the brake-shoe 12B further comprises a projection 40, the lower face 41 of which is intended to serve as a retaining abutment for the transfer member 14.

The trannsfer member 14 is a substantially flat ring, the internal contour of which forms, on the side of the brake-shoe 12A a shoulder 45 for the reception of the hydraulic operating unit 13.

This shoulder 45 is coupled to the internal contour of the transfer member 14 by two supporting surfaces 46, 46' which are substantially parallel to the plane of the disc.

Beyond these supporting surfaces 46, 46', the internal contour of the transfer member 14 forms on each side of these latter, two forwardly-projecting stepped portions 47, 47'.

On the side of the brake-shoe 12B, the transfer member 14 is engaged under the projection 40 of this brake-shoe, and its internal contour forms two lugs 50, 50' supported against this brake-shoe.

The hydraulic operating unit 13 comprises a blind cylinder 55 and a piston 56 movable in the blind cylinder 55 for action on the brake-shoe 12A.

Internally, the blind cylinder 55 and the piston 56 conjointly form a chamber 57, the fluid-tightness of which is ensured by a joint 58 arranged in an annular groove 59 formed for that purpose in the cylinder 55, and which communicates with the exterior, on the one hand by a supply nozzle 60 capable of being coupled to a source of fluid under pressure, and on the other hand by a drainage or blow-out nozzle 61.

Externally, the blind cylinder 55 is provided laterally and on opposite sides with two transverse lugs 65, 65' forming parallel to the plane of the disc 10 abutment surfaces 66, 66' for application against the supporting surfaces 46, 46' of the transfer member 14, substantially perpendicular to the plane of the disc 11.

The lugs 65, 65' of the blind cylinder 55 are further provided on their edges with a square shoulder 68, 68', by which they are engaged and guided on the forward projections 47, 47' of the internal contour of the transfer member 14.

In the example of construction shown in FIGS. 1 to 5, this engagement is effected with a slight play and the blind cylinder 55 is subjected to the action of a spring 70 which, while being supported on the transfer member 14, ensures the application of the blind cylinder 55, by its lug 65, 65', against the supporting surfaces 46, 46' of the transfer member.

In the example shown, this spring 70 is of round wire and has a general Y-shape, the lateral branches 71, 71' of which form at their extremities hooks 76, 76' engaged on the lugs 65, 65' of the blind cylinder 55, and the central portion 72, 72' of which has a deformation permitting its engagement and hooking on the outer edge of the transfer member 14.

In the example of construction shown in FIGS. 1 to 5, the blind cylinder 55 further comprises externally on its rear transverse face a projection 75 under which is engaged the transfer member 14.

For co-operation with the locking pins 27, 27', and more precisely with the cylindrical barrels 29, 29' of these latter, the lugs 65, 65' of the blind cylinder 55 each have two flat guiding surfaces 73, 74 and 73', 74', respectively, which conjointly form a dihedron.

The guiding surfaces 73, 73' are substantially parallel to the radial plane of symmetry of the brake and the guiding surfaces 74, 74' are substantially perpendicular to this plane.

On the studs 25, 25' provided for that purpose on the fixed support 10, are engaged torsion springs 80, 80', of which one of the arms 81, 81' is supported on the fixed support 10, on the lateral edge of this latter, and of which the other of the arms 82, 82' is applied against the transfer member 14 by the lower face of this latter.

Circlips 84, 84' ensure the axial retention of these torsion springs 80, 80'.

By reason of these torsion springs 80, 80', the transfer member is subjected to a force which is applied substantially along the radial direction of the disc comprised in the radial plane of symmetry of the brake, from the axis of the disc to its periphery.

On the side of the disc corresponding to the hydraulic operating unit 13, the transfer member 14 which is coupled to this unit by the engagement of the lugs 65, 65' of this latter on the forward steps 47, 47' of its internal contour, and which moreover, in the examples shown in FIGS. 1 to 5, is supported against the external projection 75 formed on this unit, is retained radially through the intermediary of this latter by the locking and guiding pins 27, 27', against the cylindrical barrel 29, 29' of which the hydraulic operating unit 13 is supported by the guiding surfaces 73, 73' and 74, 74' comprised on the lugs 65, 65' of its blind cylinder 55.

On this side of the disc, it is therefore through the hydraulic operating unit 13 that the radial retention of the transfer member 14 is effected in the direction of the force applied to this member by the springs 80, 80'.

On the other side of the disc 11, that is to say on the side of this latter opposite to the hydraulic operating unit 13, the radial retention of the transfer member 14 in this direction is effected through the brake-shoe 12B, the transfer member 14 being engaged underneath the projection 40 of this member and this brake-shoe being in abutment by its projections 36, 36' against the supporting surfaces 35, 35' provided for that purpose on the central extension 17 of the return 16 of the fixed support 10.

Figure 1:
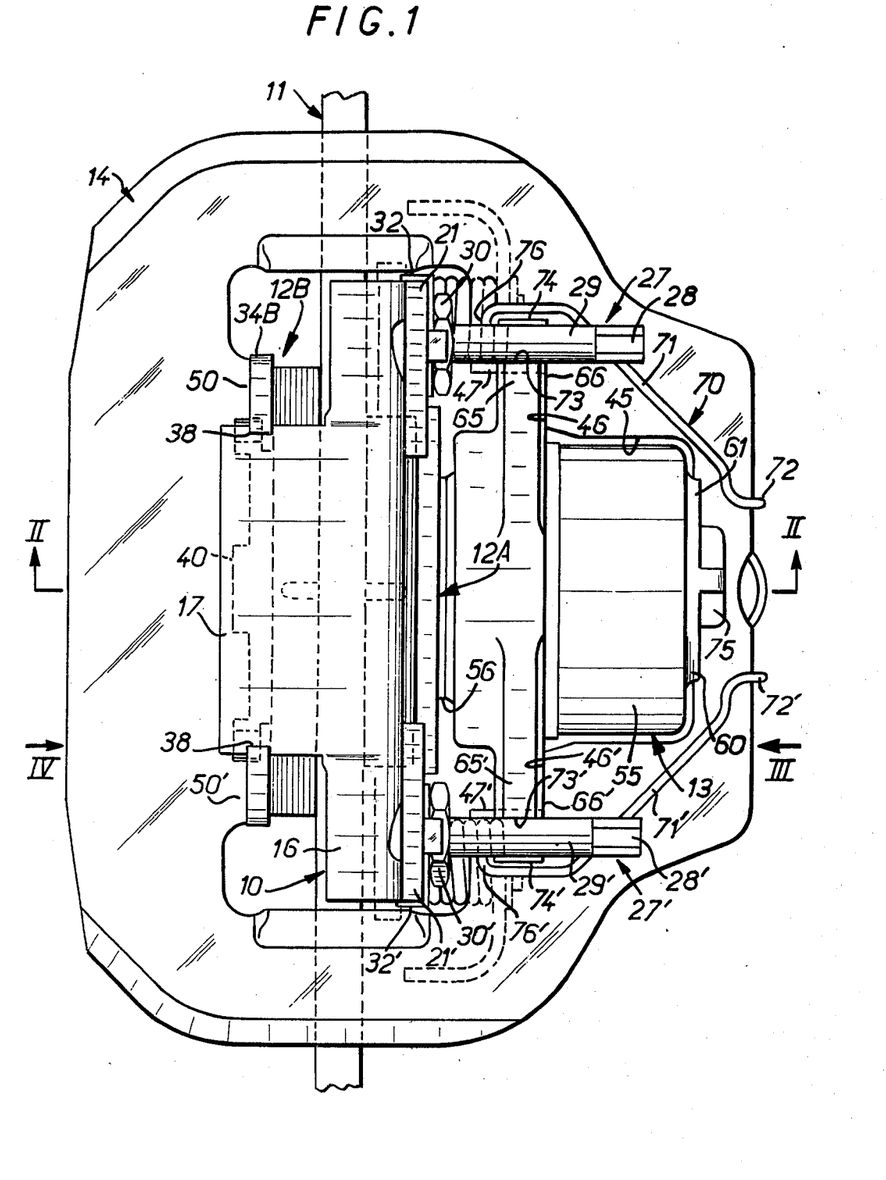
FIG. 1 is a plan view of a brake according to the invention.
Figure 2:
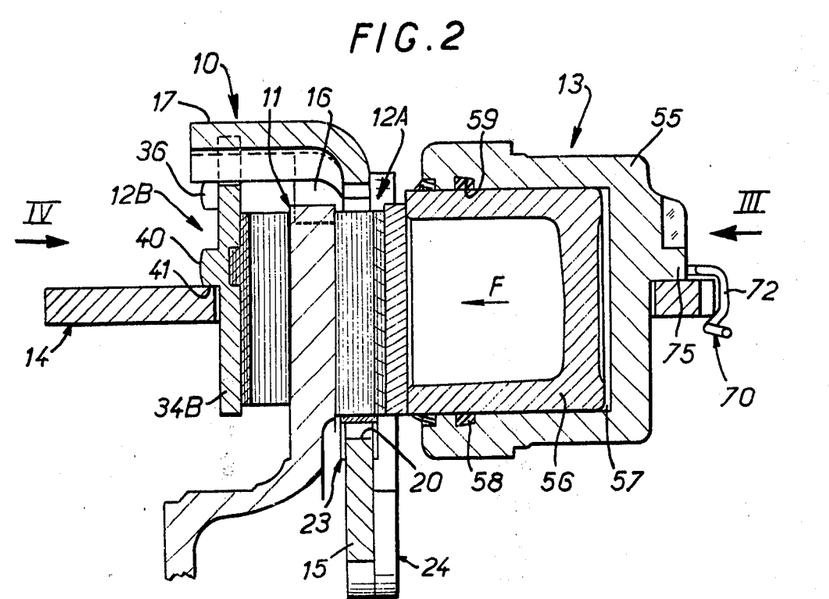
FIG. 2 is a view of this brake in axial section, taken along the line II—II of FIG. 1.
Figure 3:
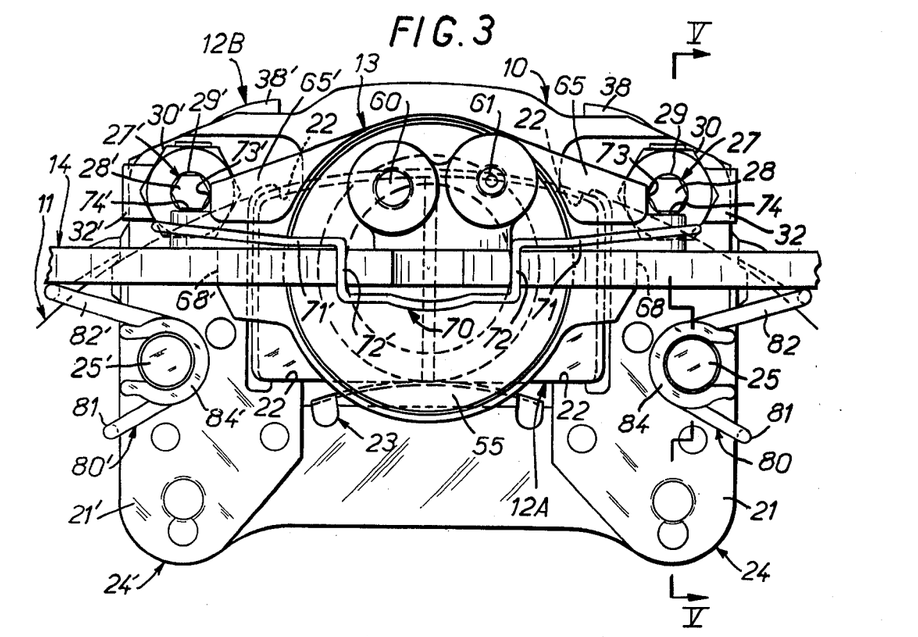
FIGS. 3 and 4 are lateral views of this brake taken respectively in the direction of the arrows III and IV of FIG. 2.
Figure 4:
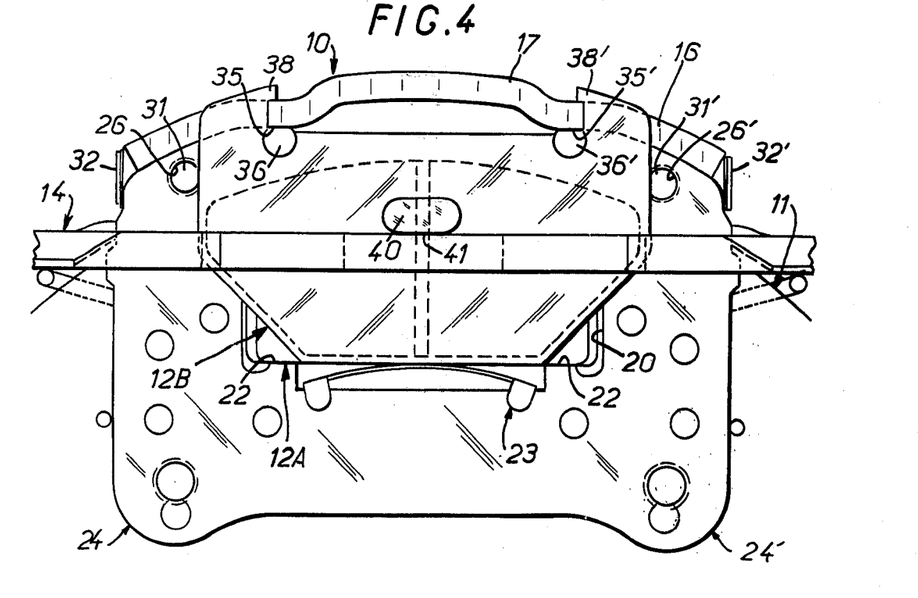
Figure 5:
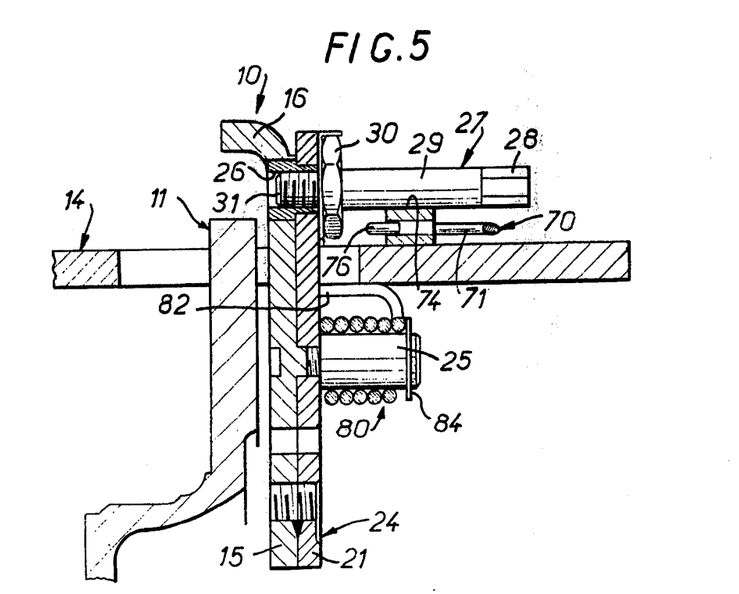
FIG. 5 is a view in transverse section of this brake, following the broken line V—V of FIG. 3.

The assembly of the brake according to the invention is carried out very easily in the following manner:

The brake-shoe 12A is placed in position in its housing 20, the brake-shoe 12B is engaged by its hooks 38, 38' on the extension 17 of the return 16 of the fixed support 10, the torsion springs 80, 80' are placed in position on the studs 25, 25' of the support 10, the transfer member 14 is engaged radially on the fixed support 10 until force is applied on the torsion springs 80, 80', the transfer member 14 is moved radially in the direction opposite to that of the arrow F of FIG. 2 for its engagement underneath the projection 40 of the brake-shoe 12B, the hydraulic operating unit 13 is placed in position in the shoulder 45 of the internal contour of the transfer member 14 with engagement of the lugs 65, 65' of this unit on the forward steps 47, 47' of the internal contour of this transfer member, the hydraulic operating unit 13 is fixed on the transfer member 14 by placing the spring 70 in position and the locking and guiding pins 27, 27' are put in place.

The dismantling of the brake, especially for the purpose of access to the brake-shoes to permit their replacement is just as easy: it is in fact only necessary to remove the locking and guiding pins 27, 27'.

In operation, when fluid under pressure is sent into the chamber 57, the piston 56 of the hydraulic operating unit 13 is moved parallel to the axis of the disc in the direction of the arrow F of FIG. 2, and applies the brake-shoe 12A against the disc 11 to be braked.

Conjointly, the blind cylinder 55 and therefore the transfer member 14 which is fixed to it, move in opposite directions and apply the brake-shoe 12B against the disc 11.

The disc 11 is thus gripped by the brake-shoes 12A, 12B and is therefore braked until it stops if so desired.

When the pressure in the chamber 57 is released, the disc 11 is also released.

It will be appreciated that during conjoint movements of the transfer member 14 and the hydraulic operating unit 13, the corresponding guiding contact by the locking and guiding pins 27, 27' is advantageously effected between flat surfaces and a cylindrical surface, which is favourable to a good sliding action irrespective of the state of cleanliness of these surfaces.

Figure 6:
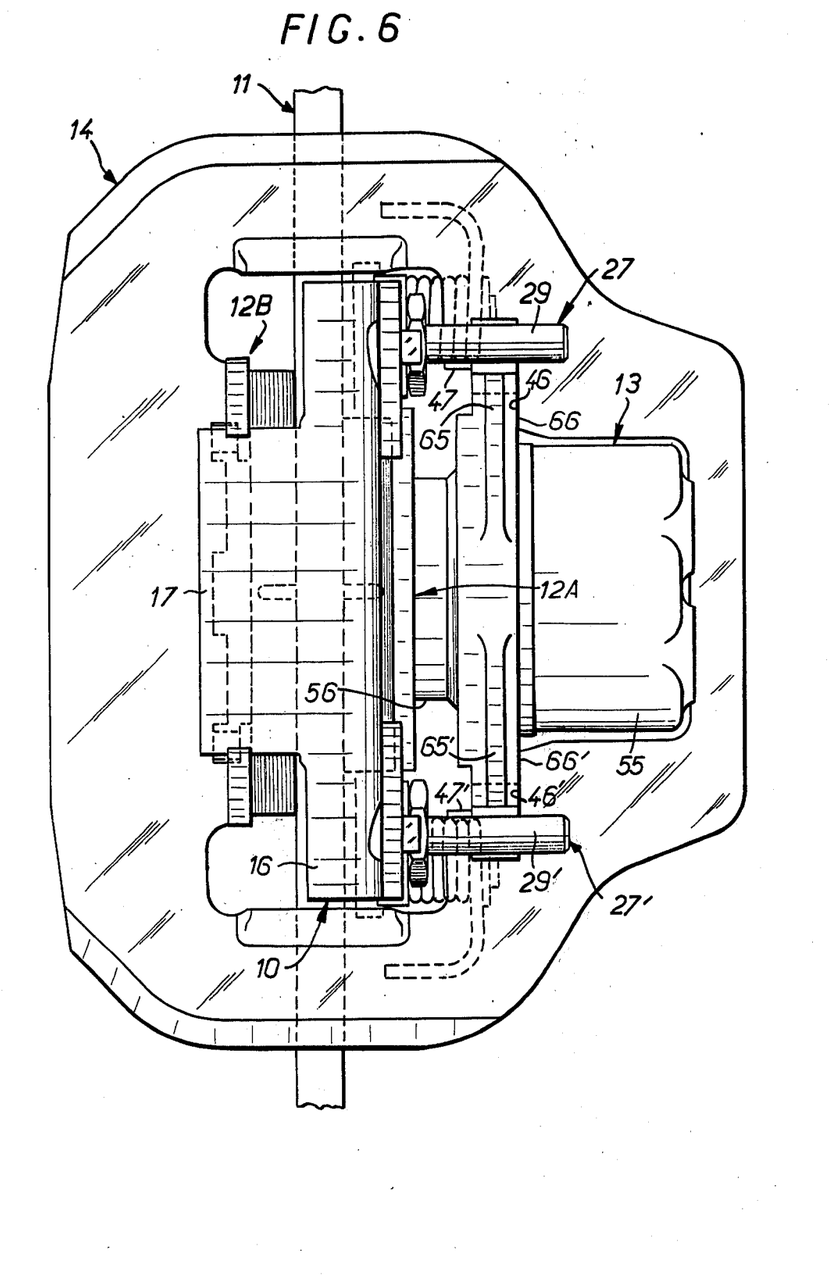
FIGS. 6 and 7 are views respectively similar to FIGS. 1 and 3, and relate to an alternative form of construction.
Figure 7:
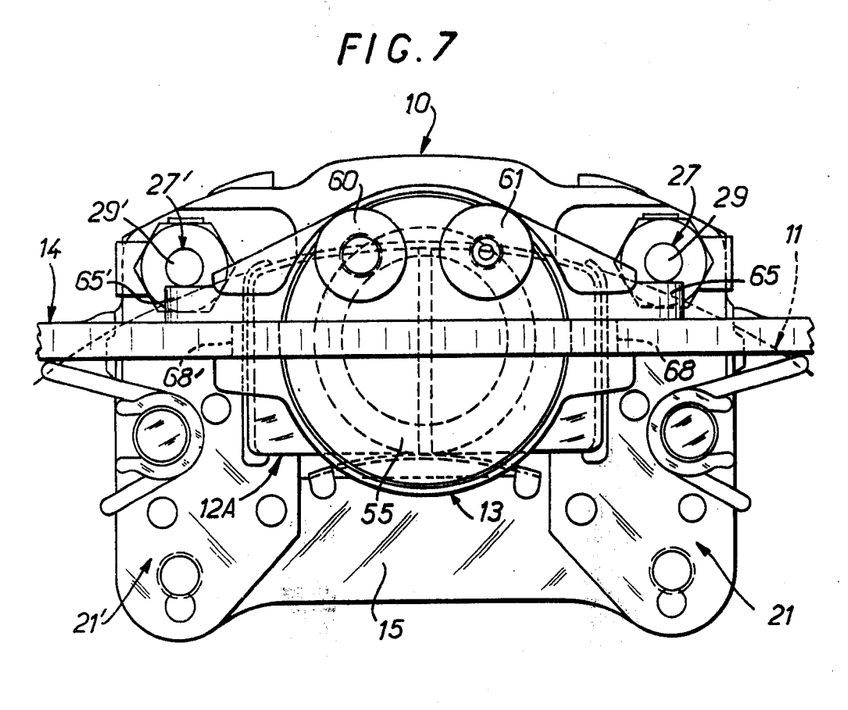

According to the alternative form of construction illustrated by FIGS. 6 and 7, the engagement of the lugs 65, 65' of the hydraulic operating unit 13 on the forward steps 47, 47' provided on the internal contour of the transfer member 14 is a forced engagement sufficient to ensure correct adhesion of the hydraulic operating unit 13 with the transfer member 14. In the example shown, the square shoulders 68, 68' provided for that engagement belong to slots.

It is therefore no longer necessary to provide a spring for maintaining the operating unit 13 in application by the surfaces 66, 66' of its lugs 65, 65' against the corresponding supporting surfaces 46, 46' of the transfer member 14.

It may also be noted that the retaining projection provided on the outer transverse face of the hydraulic operating unit 13 is no longer necessary.

The definite contact of the lugs 65, 65' of the hydraulic operating unit 13 against the corresponding supporting surfaces 46, 46' of the transfer member 14 is effected during the first gripping action on the disc 11.

Furthermore, according to this alternative form, the cylindrical barrel 29, 29' of the locking pins 27, 27' is continued up to the extremities of these latter, which thus have no longer any operating heads.

The operation of this alternative is similar in all respects to that described above. In the form of embodiment shown in FIGS. 8 to 12, the fixed support 110 is a moulded part of cast-iron and as previously it has the general shape of a so-called L bracket. It comprises an end-plate 115 which extends substantially parallel to the plane of the disc 11 and a square return 116 which extends substantially perpendicular to this plane, beyond the periphery of the disc 11. In its central zone, this return 116 comprises a central extension 117.

In its lower portion, the end-plate 115 of the fixed support 110 has a shoulder zone 118 which forms fixing lugs 21, 21' and which is coupled to the remainder of the end-plate 115 by a square portion forming laterally supporting edges 119, 119', the function of which will become apparent later. Only the supporting edge 119 is visible in FIG. 10.

The end-plate 115 of the fixed support 110 further comprises, facing the disc 11, a generally rectangular window 20 intended to serve as a housing for the brake-shoe 12A.

On each side of the window 20, the end-plate 115 of the fixed support 110 is provided at its lower portion with studs 25, 25' which extend substantially parallel to the axis of the disc and the function of which will be explained below.

Also on each side of the window 20, but at its upper portion, the end-plate 115 of the support 110 is provided with bores 126, 126' for placing in position of locking and guiding pins 127, 127', substantially parallel to the axis of the disc.

In the example shown, these bores 126, 126' are smooth bores and they pass right through the end-plate 115 in which they are formed.

Each of these locking and guiding pins 127, 127' generally comprises, in the example shown in FIGS. 8 to 12, a cylindrical barrel 129, 129' and a smooth extremity 131, 131' intended to be engaged in the corresponding bore 126, 126' of the fixed support.

In addition, releasable locking means are associated with each of these locking and guiding pins for the controlled axial retention of these pins on the fixed support.

In the example shown in FIGS. 8 to 12, these releasable locking means comprise, for each locking and guiding pin, a blocking or stop-member 128, 128', fixed in a removable manner on the fixed support 110 for co-operation in locking with a complementary bearing surface 199, 199' formed for that purpose on the locking and guiding pin 127, 127' corresponding thereto.

In the example shown, such a stop-member 128, 128' is a simple locking plate which penetrates by its edge into a groove 130, 130' formed on the associated locking pin, one of the sides of this groove 130 forming the bearing surface 199 with which this stop-member is intended to co-operate in retention. According to an alternative form of construction (not shown), such a locking plate forms a fork adapted to enclose the corresponding locking and guiding pin at least partially, the edge of the bottom of the notch of this fork penetrating as previously into the groove of the said pin.

In the example shown, the locking plate 128 associated with the locking and guiding pin 127 is coupled br a bridge member 132 to the locking plate 128' associated with the locking and guiding pin 127', and the locking plates 128, 128' and the bridge member 132 which couples them together conjointly from one single part 133.

Such a part 133 can easily be produced by appropriately cutting out and bending a piece of sheet steel.

In practice, the locking plates 128, 128' form lugs permitting the fixing of this part 133 in a removable manner to the fixed support 110 by means of screws 185, 185', with the interposition of washers of the fan type 186, 186'.

On its lower face, the central extension 117 of the return 116 of the fixed support 110 forms two supporting surfaces 135, 135', substantially flat and co-planar, for the radial retention of the brake-shoe 12B.

The brake-shoe 12B is furthermore similar to that which has been described above with reference to FIGS. 1 to 5.

This is also true with regard to the ring forming the transfer member 14.

In particular, this ring is provided with a shoulder for engagement of a hydraulic operating unit 113 which, as previously, comprises a blind cylinder 55 and a piston 56 movable in the blind cylinder 55 in order to act on the brake-shoe 12A.

As described, the engagement of the blind cylinder 55 on the transfer member 14 takes place with a slight play and the blind cylinder 55 is subjected to the action of a spring 170 which, being supported on the transfer member 14, ensures axially the application of the blind cylinder 55 by its lugs 65, 65' against the supporting surfaces 46, 46' of the transfer member. In addition, this spring 170 also effects radially the application of the blind cylinder 55 against the corresponding portion of the transfer member 14.

As described above, this spring 170 is of round wire and has generally the shape of a U.

According to the form of construction shown in FIGS. 8 to 12, the central portion 172 of this spring 170 is coupled to the operating unit 13, and its lateral arms 171, 171' are engaged on the transfer member 14.

In practice and as shown, the spring 170 is mounted in a zone 75 of the blind cylinder 55 which projects from the rear transverse face of this latter and which is overhanging at this point the corresponding portion of the transfer member 14.

This projecting zone 75 of the blind cylinder 55 has a groove 77 for hooking a spring 170, the lateral arms 171, 171' of which each comprise a zone bent in an S for support against the lower face of the transfer member 14.

This arrangement makes it possible to give the lateral arms of this spring, which are in this case the elements of this spring intended to permit its handling, a development intended to facilitate such handling.

For co-operation with the locking pins 127, 127' and more precisely with the cylindrical barrels 129, 129' of these pins, the lugs 65, 65' of the blind cylinder 55 are each provided with two flat guiding surfaces 73, 74 and 73', 74', respectively, forming conjointly a straight dihedron with an edge perpendicular to the plane of the disc 11, as previously.

The guiding surfaces 73, 73' are substantially parallel to the radial plane of symmetry of the brake, and the guiding surfaces 74, 74' are substantially perpendicular to this plane.

On the studs 25, 25' carried for that purpose on the fixed support 10 are engaged torsion spring 180, 180', of which one of the arms 181, 181' is supported against the fixed support 10, on the supporting edges 119, 119' provided on the support as previously described, and of which the other of the arms 182, 182' is applied against the transfer member 14 by the lower face of this latter.

Circlips 84, 84' ensure the axial retention of these torsion springs 180, 180' as previously.

Due to these torsion springs 180, 180', the transfer member is subjected to a force which is applied substantially along the radial direction of the disc in the radial plane of symmetry of the brake, from the axis of the disc to its periphery.

It will be observed that the end arm of a torsion spring 180, 180' which is in contact with the transfer member 14 is that of its arms which is axially nearest to the disc 11.

Figure 8:
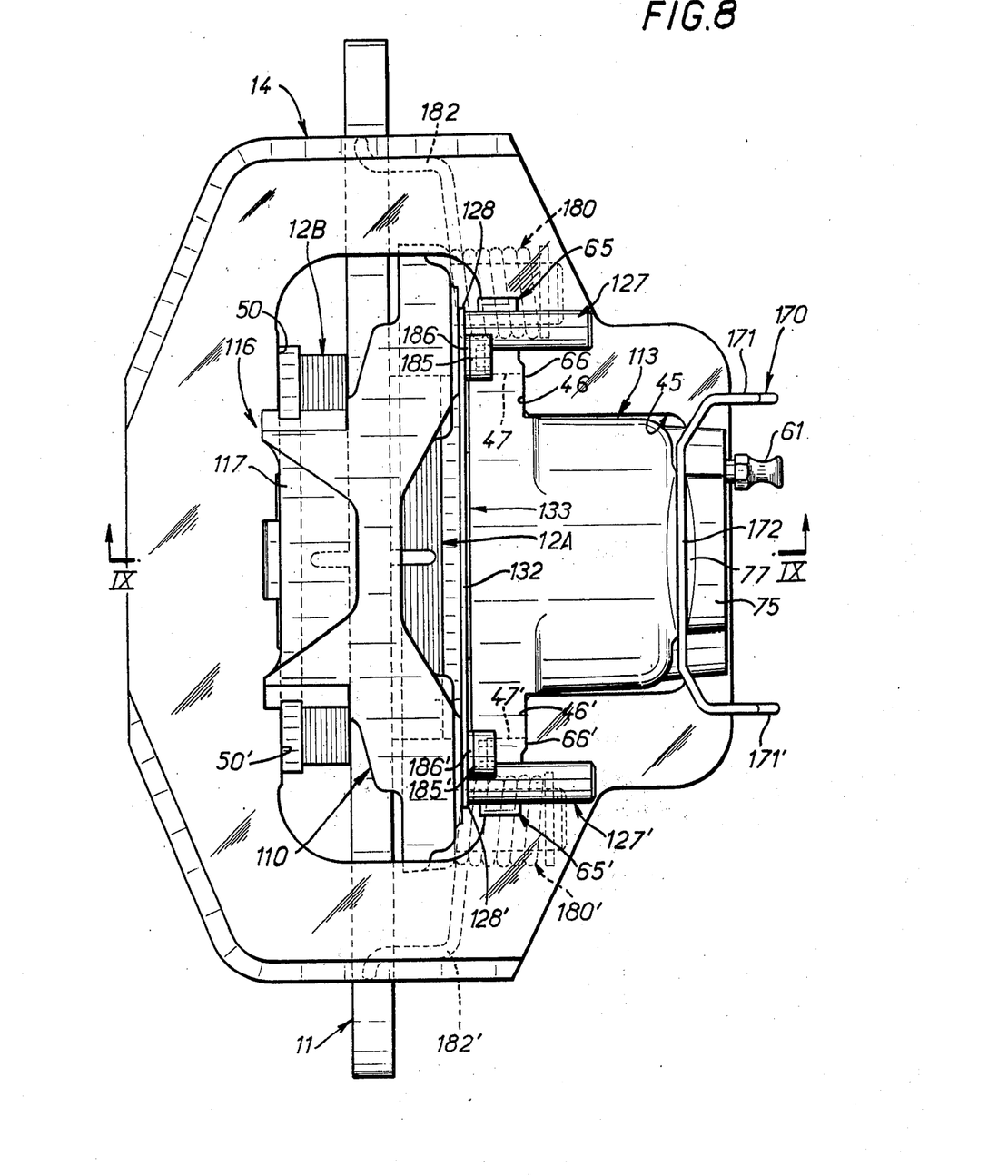
FIG. 8 is a plan view of an alternative form of construction of a brake in accordance with the invention.
Figure 9:
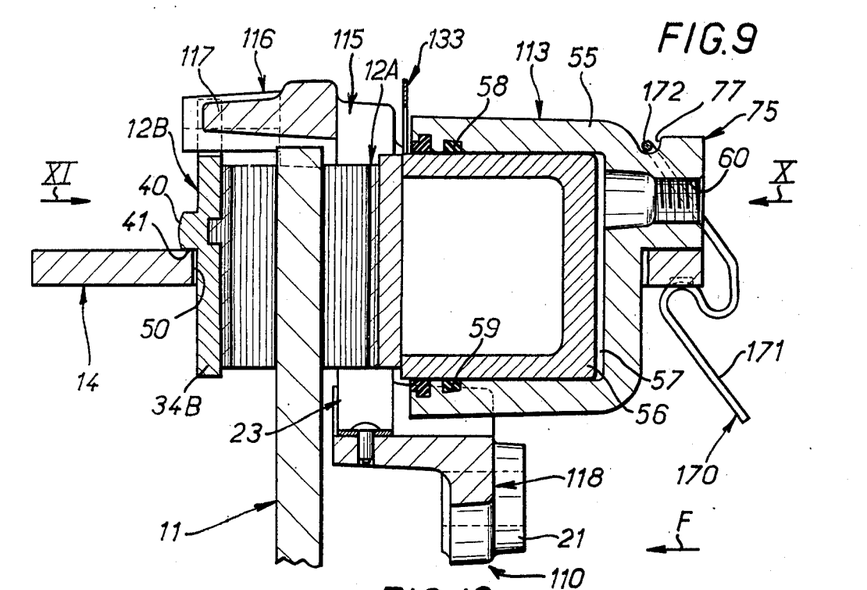
FIG. 9 is a view of this brake in axial section, taken along the line IX—IX of FIG. 8.
Figure 10:
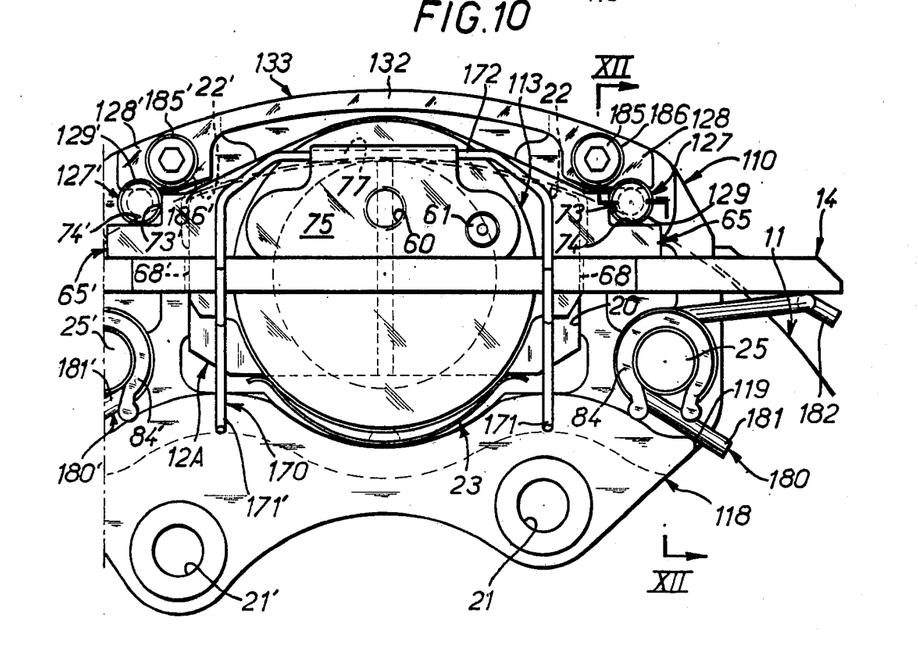
FIGS. 10 and 11 are partial side views of this brake taken respectively following the arrows X and XI of FIG. 9.
Figure 11:
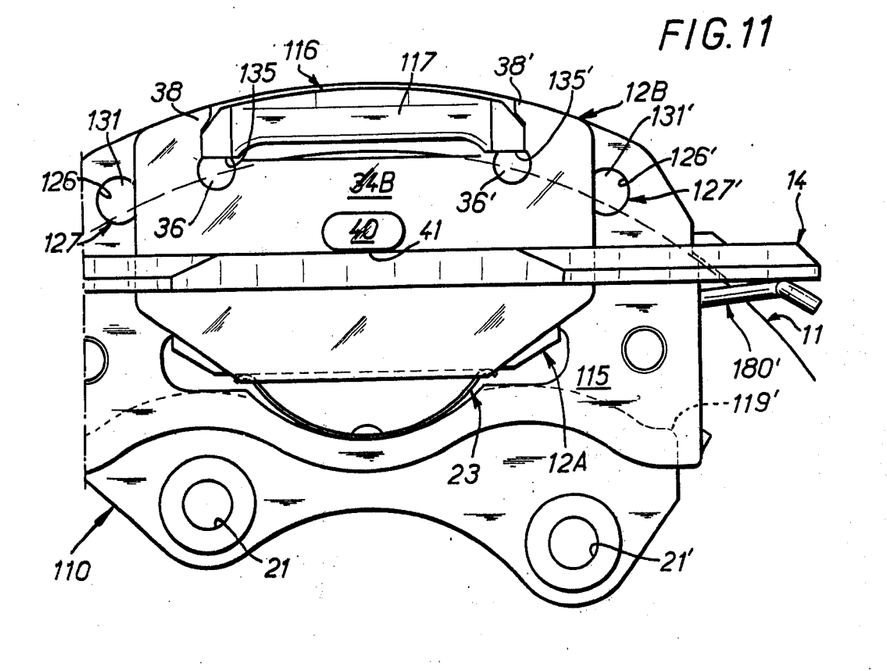
Figure 12:
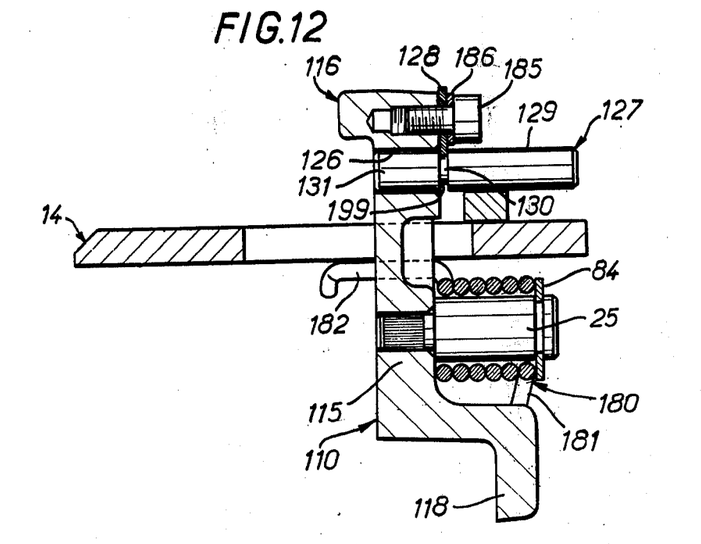
FIG. 12 is a view in transverse section of this brake taken along the broken line XII—XII of FIG. 10.
Figure 13:
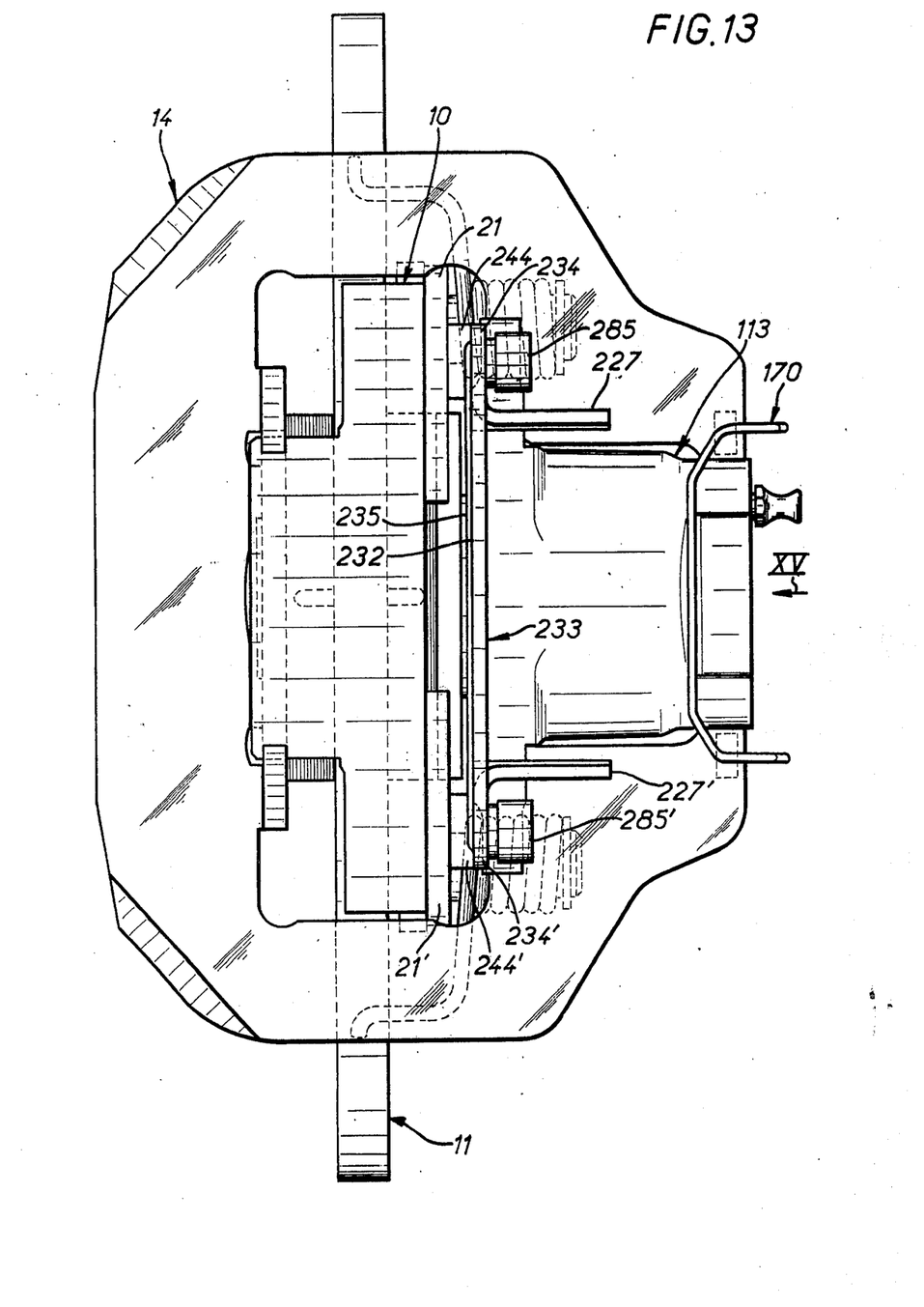
FIGS. 13, 14 and 15 are views respectively similar to FIGS. 8, 9 and 10 and relate to another alternative form of construction of the brake according to the invention.
Figure 14:
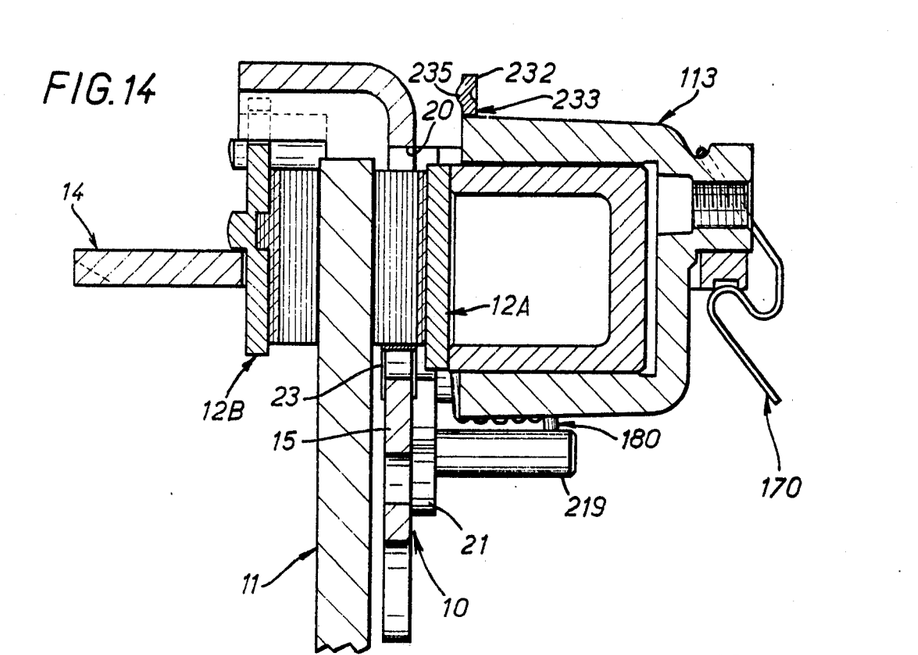
Figure 15:
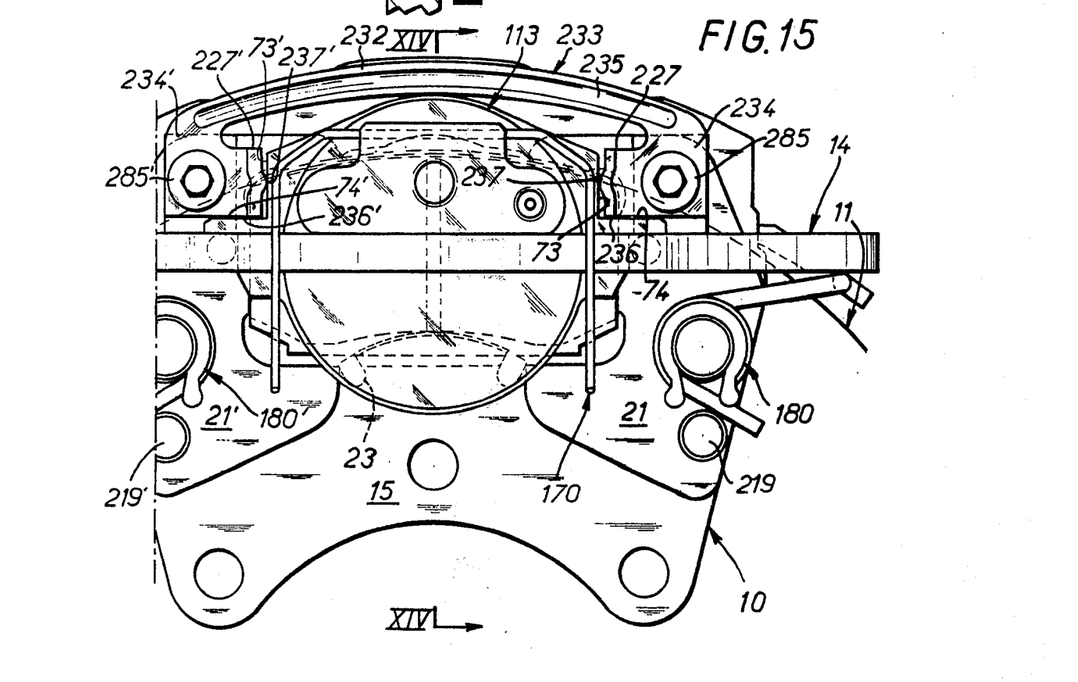

In practice, the extremities of these arms are substantially level with the disc 11, as will be apparent from FIG. 8.

By virtue of this arrangement, the rocking couple which could possibly be applied to the transfer member 14 due to its torsion spring 180, 180' is advantageously minimized and even eliminated.

On the side of the disc corresponding to the hydraulic operating unit 113, the transfer member 14 which is coupled to this unit by the engagement of the lugs 65, 65' of this latter on the forward steps 47, 47' of its internal contour, and which in addition, in the example shown, is supported against the outer projection 75 provided on this unit is, through the intermediary of this latter, retained radially by the locking and guiding pins 127, 127' against the cylindrical barrel 129, 129' by which the hydraulic operating unit 113 is supported by the guiding surfaces 73, 73' and 74, 74' provided on the lugs 65, 65' of its blind cylinder 55.

The assembly and dismantling of this alternative form of construction are carried out very easily as described above with reference to FIGS. 1 to 5.

The operation of this alternative is also similar.

In the alternative form of construction illustrated by FIGS. 13 to 16, the fixed support 10 is a support of the same type as that described with reference to FIGS. 1 to 5.

It therefore comprises a support of sheet metal suitably cut-out and bent, reinforced on each side of the window 20 by the plates 21, 21'.

In accordance with this alternative, at least one of the locking and guiding pins is a simple member of sheet metal 227, 227', suitably cut-out and bent, fixed in a removable manner on the fixed support, the said sheet metal member having at least one guiding edge perpendicular to the plane of the disc 11 for co-operation in guiding with the operating unit 113.

In the example shown, each locking and guiding pin is thus constituted by a piece of sheet steel 227, 227' and the two pieces of sheet thus utilized are coupled to each other by a bridging member 232.

In practice, the parts of sheet steel 227, 227', and the bridge member 232 which couples them form conjointly one single part 233.

This part 233 is provided laterally and on each side with lugs 234, 234' by which it is fixed in a removable manner on the support 10 by means of screws 285, 285'.

In the example shown in FIGS. 13 to 16, the lugs 234, 234' are substantially in the plane of the bridge 232 which is substantially flat, with the exception of a stiffening rib 235, and the portion of the member 233 which constitutes the locking and guiding pins is the result of return members bent-back square with respect to this plane. In the example shown, the lugs 234, 234' are furthermore lined by reinforcing plates 244, 244'.

Each of these returns 227, 227' forms by its edge a first guiding edge 236, 236' intended to co-operate with the guiding faces 74, 74' of the operating unit 113.

In addition, each of these returns 227, 227' is corrugated with generator lines perpendicular to the plane of the disc, the rounded portion 237, 237' of which forms a second guiding edge intended to co-operate with the guiding faces 73, 73' of the operating unit 113.

Furthermore, in the form of construction shown in FIGS. 13 to 16, the supporting edge provided on the support 10 for supporting one of the end arms of the torsion springs 180, 180' is formed by one of the generator lines of a stud 219, 219' fixed for that purpose on the lower part of the end plate 15 of the fixed support 10, perpendicular to this end-plate.

Similarly, in this alternative form, the elastic retention of the brake-shoe 12A in the window 20 of the support 10 is effected by a spring 23 of the same type as described with reference to FIGS. 1 to 5.

The assembly, dismantling and operation of this alternative form of construction are similar to those described previously with reference to FIGS. 1 to 5.

It will be noted that the two locking and guiding pins being formed on one single part which constitutes in itself the releasable locking means adapted to retain axially these locking and guiding pins on the fixed support, the mounting and dismantling of the brake are facilitated and the production cost of the brake is reduced.

Figures 16, 17:
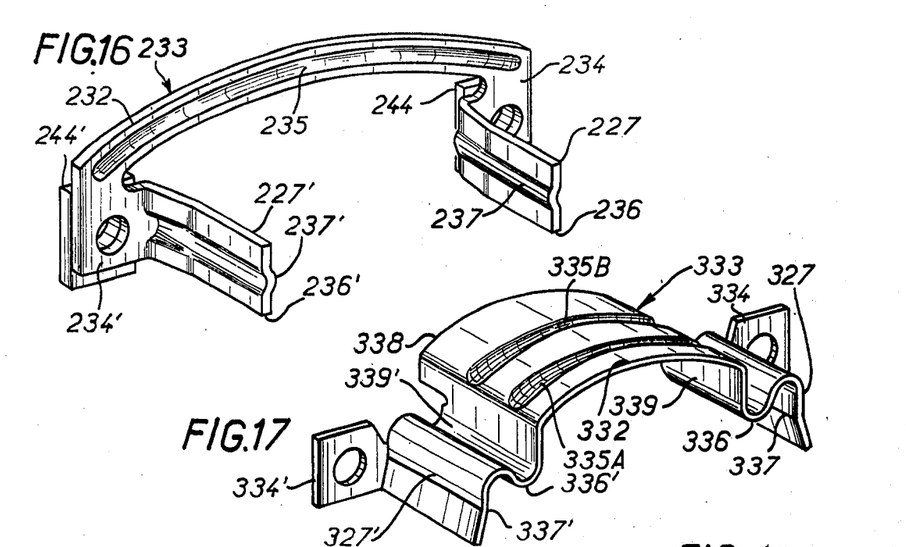
FIG. 16 is a perspective view of the member forming the locking and guiding pins employed in the brake illustrated by FIGS. 13 to 15.
FIG. 17 is a view similar to FIG. 15 and relates to an alternative form of construction of this member.
Figure 18:
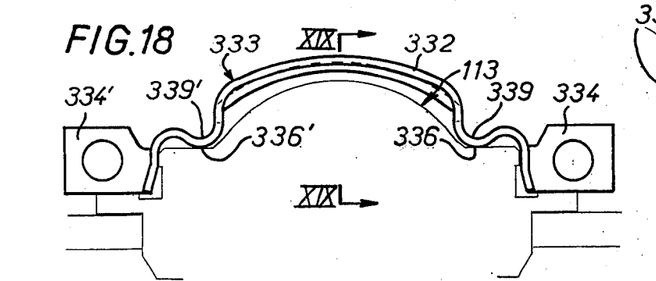
FIG. 18 is a view in elevation of the member shown in FIG. 17.
Figure 19:
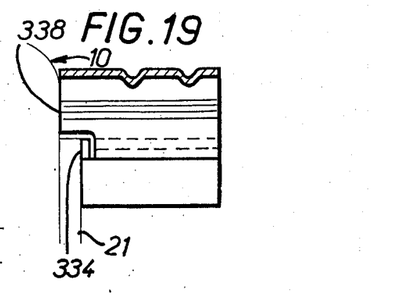
FIG. 19 is a view in transverse section taken along the line XIX—XIX of FIG. 18.

According to the alternative form of construction of the member 233 illustrated by FIGS. 17 to 19, the central bridge member 332 of this part, which has been given the reference 333 in these drawings, has a generally cylindrical contour with generator lines perpendicular to the plane of the disc 11, and therefore to the plane of the lugs 334, 334' with which it is provided laterally for fixing it on the support 10.

This bridge 332 is provided in the example shown with two stiffening ribs 335A, 335B and is extended beyond the lugs 334, 334'.

The extreme edge of this extension forms a shoulder 338 intended to come into contact against the fixed support 10 between the lateral plates 21, 21' which reinforce it.

Conjointly, in this alternative form of construction, the bridge 332 is extended laterally in one single piece so as to constitute on each side parts of sheet steel 327, 327' forming locking and guiding pins 327, 327', and the guiding edge 336, 336' provided on these pins for co-operation with a flat guiding face of the operating unit 13 parallel to the general plane of the transfer member 14 is formed by the rounded portion of a corrugation 339, 339' of generator lines perpendicular to the plane of the disc 11 associated with the said sheet steel parts 327, 327'.

As previously, the guiding edge 337, 337' also provided on the locking and guiding pins for co-operation with a flat guiding face of the operating unit 113 perpendicular to the general plane of the transfer member 14 results from a slight deformation of the corresponding portion of the sheet steel parts 327, 327' belonging to the member 333.

According to the alternative form shown in FIG. 20, the fixed support of the brake is a moulded member 110, as described with reference to FIGS. 8 to 12, and the locking and guiding pins are each constituted by a generally cylindrical individual member.

Figure 20:
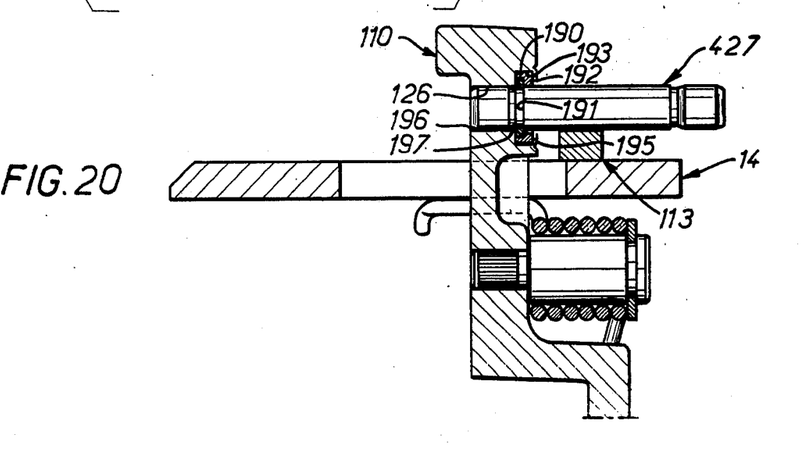
FIG. 20 is a view similar to FIG. 15 and relates to an alternative form of construction.

Only one of these pins can be seen in FIG. 20 in which it is designated by the reference 427.

This pin is engaged by one of its extremities in a smooth bore 126 of the fixed support 110 and the releasable locking means which are associated therein are constituted by elastically-retractable means provided between such a pin and the fixed support 110.

In the example shown, these elastically-retractable means comprise, for each locking and guiding pin, a radially-deformable elastic split-ring 190 retained axially on the fixed support 110 at the outlet of the bore 126 and projecting slightly radially at rest into the said outlet for co-operation with a groove 191 formed for that purpose on the locking and guiding pin concerned.

In the example shown, the split-ring 190 is retained axially by a ring 192 fixed in a housing 193 provided round the bore 126 concerned, and this ring is in turn retained axially by bending back on itself, by hammering at least part of the free edge of the annular housing 193, as shown diagrammatically at 195 in the drawing.

Preferably, and as shown, the extremity by which such a locking and guiding pin is intended to be engaged in the corresponding bore 126 of the fixed support 110 comprises a chamfer 196 and this also applies to that transverse wall 197 of the groove 191 co-operating with the split-ring 190 which is nearest to the said extremity.

As will be understood, this arrangement facilitates the placing in position and the removal of such a locking and guiding pin 427.

Preferably and as shown, the two extremities of this locking and guiding pin are identical, which enables such a pin to be engaged in the bore 126 indifferently by either of its extremities.

It will of course be understood that the present invention is not restricted to the forms of construction described and shown, but includes any alternative form of construction and/or combination of their various parts.

In particular, the fixed support 10 could be of the U-type and could comprise two end-plates parallel to the disc and on each side of this latter, each of the said end-plates being provided with a window ensuring, at least in part, the housing for a brake-shoe.

What I claim is:

1. A disc brake comprising a fixed support, a disc adapted to be mounted for rotation on a shaft to be braked, a brake shoe disposed on each side of said disc and movable perpendicularly to the plane of said disc, a hydraulic operating unit disposed on one side of said disc and including a blind cylinder member and a piston slidably mounted in said cylinder member, said piston acting directly on one of said brake shoes adjacent thereto, a generally ring-like transfer member extending chordally of said disc and generally around said disc and said brake shoes and said hydraulic operating unit for acting on said other brake shoe in response to said cylinder member, resilient means secured to said fixed support and urging said transfer member radially outwardly relative to said disc, retention means for limiting the radial movement of said transfer member including two retaining and guiding pin means removably mounted on said fixed support and extending to said one side of said disc, both said pin means being substantially parallel to the axis of said disc, said cylinder member having at least one flat guiding surface thereon opposite each said pin means and in sliding line contact with said pin means.

2. A disc brake as claimed in claim 1, in which each said retaining and guiding pin means has a cylindrical portion and the cylindrical portion is in contact with at least said one flat guiding surface.

3. A disc brake as claimed in claim 2, wherein at least one of said pin means is a simple bent and cut-out sheet metal member, said sheet metal member having at least one guiding edge perpendicular to the plane of said disc for guiding cooperation with another flat furface.

4. A disc brake as claimed in claim 3, wherein said guiding edge is formed at an edge of said sheet metal member.

5. A disc brake as claimed in claim 3, wherein said guiding edge is a rounded corrugation in said sheet metal member.

6. A disc brake as claimed in claim 3, wherein said sheet metal member has two guiding edges each cooperating with another said flat surface, said last-mentioned flat surfaces defining a right dihedral angle with its common edge perpendicular to the plane of said disc.

7. A disc brake as claimed in claim 3, wherein both said pin means are formed in said sheet metal member and coupled together by a bridge member.

8. A disc brake as claimed in claim 7, wherein said bridge member has a stiffening rib.

9. A disc brake as claimed in claim 7, wherein said bridge member has at least in its central portion a shoulder for bearing against said fixed support.

10. A disc brake as claimed in claim 7, wherein said sheet metal member is of one-piece construction.

11. A disc brake as claimed in claim 10, wherein said sheet metal member has two laterally extending lugs for fixing said sheet metal member to said fixed member by screws.

12. A disc brake as claimed in claim 1, wherein two flat guiding surfaces defining a dihedral angle are provided for each pin means.

13. A disc brake as claimed in claim 12, wherein said dihedral angle is substantially a right angle, one of said flat guiding surfaces for each pin means being substantially parallel to the radial plane of symmetry of said brake and the other of said guiding surfaces for each pin means being substantially perpendicular to said radial plane.

14. A disc brake as claimed in claim 1 wherein one end of each pin means is received in a smooth bore in said fixed support, and releasable locking means associated with each said pin means for controlled axial retention on said fixed support.

15. A brake as claimed in claim 14 wherein each said releasable locking means comprises a locking member removably secured to said fixed support for locking cooperation with a complementary bearing surface on its respective pin means.

16. A brake as claimed in claim 15, wherein said locking member is a locking plate one edge of which is disposed in a groove in its respective pin means.

17. A brake as claimed in claim 16, wherein said locking plates are coupled by a bridge member.

18. A brake as claimed in claim 17, wherein the locking plates and said bridge member form a single member.

19. A brake as claimed in claim 14, wherein each releasable locking means comprises retractable resilient means disposed between its respective pin means and said fixed support.

20. A brake as claimed in claim 19, wherein each said retractable resilient means comprises a radially resiliently deformable split-ring retained axially on said fixed support at the open end of the bore for said locking pin and projecting radially at rest into said open end for cooperation with a groove formed in said respective pin means.

21. A brake as claimed in claim 20 wherein said split-ring is retained axially by a ring fixed in an annular housing disposed around said bore, said ring being axially retained by at least part of the outer edge of said annular housing.

22. A brake as claimed in claim 20, wherein the end of each pin means received in its corresponding bore in said fixed support has a chamfer as do also the transverse walls of the groove cooperating with the associated split-ring nearest said end.

23. A brake as claimed in claim 1 wherein bores in which said pin means are received are open ended.

24. A brake as claimed in claim 1, where the two ends of each pin means are identical.

25. A disc brake as claimed in claim 1, wherein said resilient means includes two torsion springs each having a central torsion portion received on a stud carried on said fixed support and two end arms, one of each two said end arms bearing on said fixed support and the other said end arm being in contact with said transfer member said last-mentioned arm being axially closest to said disc.

26. A disc brake as claimed in claim 25, wherein said one end arm is in contact with a supporting edge of said fixed support perpendicular to the plane of said disc.

27. A disc brake as claimed in claim 25, wherein said supporting edge is formed on a pin fixed to said fixed support.

28. A disc brake as claimed in claim 1, wherein said operating unit is coupled to said transfer member by a generally U-shaped spring of round wire, said spring having a central portion coupling it to said operating unit and lateral arms received on said transfer member.

29. A disc brake as claimed in claim 28, wherein said last-mentioned spring is mounted in a zone of said operating unit surmounting said transfer member.

30. A disc brake as claimed in claim 1, wherein said cylinder member is separate from said transfer member and is provided with a lateral lug on each side bearing against said transfer member extending generally perpendicular to the plane of said disc, each of said lugs further defining a right angular shoulder received and guided in said transfer member.

31. A disc brake as claimed in claim 30, wherein said right angular shoulder of said lug of the blind cylinder is associated with a slot.

32. A disc brake as claimed in claim 30, wherein said lugs are freely received in said transfer member spring means urging said cylinder member into contact with said transfer member.

33. A disc brake as claimed in claim 30, wherein said lugs are force-fitted in said transfer member.

34. A disc brake as claimed in claim 1, in which said flat surfaces on the cylinder member are lugs.

35. A disc brake as claimed in claim 1, wherein said fixed support is a bracket and comprises an end-plate substantially parallel to the plane of said disc and a bent back portion substantially perpendicular to said plane and extending beyond the periphery of said disc, said end-plate having a window accommodating at least a part of said one brake shoe.

36. A disc brake as claimed in claim 1, wherein said fixed support is generally U-shaped and comprises an end-plate parallel to and disposed on each side of the disc, each of said end-plates having a window for accommodating at least a part of a corresponding said brake shoe.

37. A disc brake as claimed in claim 1, wherein said transfer member is a substantially flat ring.

* * * * *